US012050424B2

(12) United States Patent
Ishida

(10) Patent No.: US 12,050,424 B2
(45) Date of Patent: Jul. 30, 2024

(54) IMAGE FORMING APPARATUS

(71) Applicant: CANON KABUSHIKI KAISHA, Tokyo (JP)

(72) Inventor: Satoshi Ishida, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/453,216

(22) Filed: Aug. 21, 2023

(65) Prior Publication Data

US 2023/0393512 A1 Dec. 7, 2023

Related U.S. Application Data

(63) Continuation of application No. 17/706,084, filed on Mar. 28, 2022, now Pat. No. 11,768,457.

(30) Foreign Application Priority Data

Mar. 31, 2021 (JP) ................................ 2021-060821

(51) Int. Cl.
*G03G 15/00* (2006.01)

(52) U.S. Cl.
CPC ..... *G03G 15/5029* (2013.01); *G03G 15/6573* (2013.01); *G03G 2215/00599* (2013.01); *G03G 2215/00637* (2013.01); *G03G 2215/00742* (2013.01)

(58) Field of Classification Search
CPC ..... G03G 15/5029; G03G 2215/00637; G03G 2215/00742; G03G 15/5062; G03G 2215/00751
See application file for complete search history.

(56) References Cited

U.S. PATENT DOCUMENTS

2013/0039672 A1* 2/2013 Ishida ................ G03G 15/5029 399/45
2013/0051818 A1* 2/2013 Mori ...................... G03G 15/65 73/632
2015/0160598 A1* 6/2015 Yagi ................... G03G 15/5029 399/45
2015/0309459 A1* 10/2015 Watanabe .......... G03G 15/5029 399/45
2017/0017181 A1* 1/2017 Watanabe .......... G03G 15/5029

* cited by examiner

*Primary Examiner* — Jessica L Eley
(74) *Attorney, Agent, or Firm* — Canon U.S.A., Inc., IP Division

(57) ABSTRACT

An image forming apparatus includes a conveying unit, an image forming unit, a fixing unit, a first driving unit, a second driving unit, a transmission unit to transmit an ultrasonic wave, and a reception unit. Where a determination is made that a timing at which excitation of the first driving unit is switched or a timing at which excitation of the second driving unit is switched overlaps with a timing to obtain a value of the ultrasonic wave received by the reception unit, the transmission unit does not transmit an ultrasonic wave. Where a determination is made that the timing at which the excitation of the first driving unit is switched or the timing at which the excitation of the second driving unit is switched does not overlap with the timing to obtain the value of the received ultrasonic wave, the transmission unit transmits an ultrasonic wave.

10 Claims, 11 Drawing Sheets

IMAGE FORMING APPARATUS

CROSS-REFERENCE TO RELATED APPLICATIONS

The present application is a continuation of U.S. patent application Ser. No. 17/706,084, filed on Mar. 28, 2022, which claims priority from Japanese Patent Application No. 2021-060821 filed Mar. 31, 2021, which are hereby incorporated by reference herein in their entireties.

BACKGROUND

Field

The present disclosure relates to image forming apparatuses, such as copying machines and laser printers.

Description of the Related Art

Image forming apparatuses in the related art form an electrostatic latent image by radiating laser beams based on image data to a charged photosensitive drum. A developing unit develops the electrostatic latent image formed on the photosensitive drum with toner to form an image. After transferring the image to a recording material, the image forming apparatuses heat the image under pressure at a fixing nip to fix the image on the recording material. Such image forming apparatuses generally use a stepping motor that performs high-accuracy positioning as a driving unit for conveying recording materials.

The image forming apparatuses use various types of recording material on which an image is to be formed. There are recording materials having various characteristics in size, base weight, and surface property. For image formation suitable for such recording materials, some image forming apparatuses are equipped with a sensor for determining the type of the recording material. Japanese Patent Laid-Open No. 2010-18433 discloses a method for determining the type of the recording material by transmitting ultrasonic waves to a recording material and receiving the ultrasonic waves that have passed through the recording material to detect the base weight of the recording material.

However, when a driving unit and a sensor for detecting the recording material are controlled with a common control unit, duplicated processing can make it impossible to perform detection by the sensor.

SUMMARY

According to an aspect of the present disclosure, an image forming apparatus includes a conveying unit configured to convey a recording material, an image forming unit configured to form an image on the recording material, a fixing unit configured to fix the image on the recording material, a first driving unit configured to drive the conveying unit, a second driving unit configured to drive the fixing unit, a transmission unit configured to transmit an ultrasonic wave, a reception unit configured to receive the ultrasonic wave, and a control unit configured to control a timing to transmit the ultrasonic wave from the transmission unit, wherein, in a case where the control unit makes a determination that a timing at which excitation of the first driving unit is switched or a timing at which excitation of the second driving unit is switched overlaps with a timing to obtain a value of the ultrasonic wave received by the reception unit, the control unit does not cause the transmission unit to transmit an ultrasonic wave, and wherein, in a case where the control unit makes a determination that the timing at which the excitation of the first driving unit is switched or the timing at which the excitation of the second driving unit is switched does not overlap with the timing to obtain the value of the ultrasonic wave received by the reception unit, the control unit causes the transmission unit to transmit an ultrasonic wave.

Further features of the present disclosure will become apparent from the following description of exemplary embodiments with reference to the attached drawings.

DESCRIPTION OF THE EMBODIMENTS

Embodiments of the present disclosure will be described hereinbelow with reference to the drawings. It is to be understood that the following embodiments do not limit the scope of the present disclosure and that not all of combinations of the characteristic described in the embodiments are absolutely necessary for the solution of the present disclosure.

First Embodiment

Image Forming Apparatus

Figure 1:
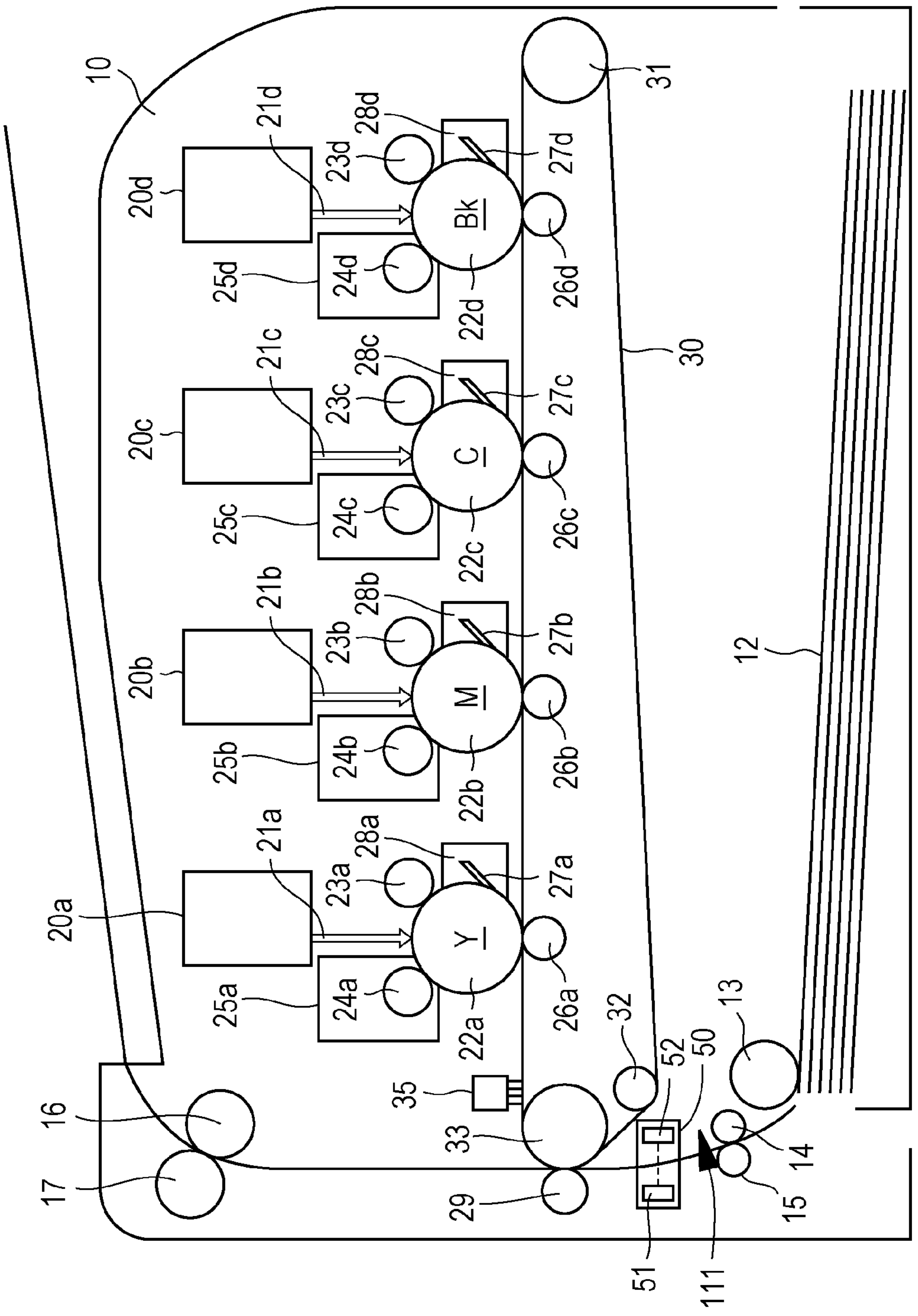
FIG. 1 is a schematic configuration diagram of an image forming apparatus.

FIG. 1 is a schematic configuration diagram of an image forming apparatus 10. The image forming apparatus 10 is an electrophotographic full-color printer that employs an intermediate transfer method. The image forming apparatus 10 includes four image forming stations that form yellow, magenta, cyan, and black images, respectively. The four image forming stations are arranged in line at regular intervals. In the following description, the last English alphabets a, b, c, and d of the reference signs indicate that the members are members for forming yellow (Y), magenta (M), cyan (C), and black (K) toner images, respectively. If there is no need to distinguish the colors in the following description, reference signs without the last English alphabets, a, b, c, and d are sometimes used.

The operation of the image forming apparatus 10 will be described. A recording material 12 fed by a pickup roller 13 is conveyed by a conveying roller pair 14 and 15. When the leading end of the recording material 12 is detected by a registration sensor 111, the convey of the recording material 12 is temporarily stopped.

A scanner unit 20 includes a reflecting mirror and a laser diode (a light emitting element) and radiates a laser beam 21 to a photosensitive drum 22, which is a photosensitive member to be rotationally driven. The photosensitive drum 22 is charged by a charging roller 23 in advance. The charging roller has a charging voltage of −1,200 V applied, for example, and the surface of the photosensitive drum 22 is charged with a voltage of −700 V, for example. When an electrostatic latent image is formed by irradiation of the laser beam 21 at this charging voltage, the potential of a portion where the electrostatic latent image is formed becomes −100 V, for example.

A developing sleeve 24 of the developing unit 25, to which a developing voltage of −350 V is applied, for example, develops the electrostatic latent image formed on the photosensitive drum 22 with toner to form an image (a toner image) on the photosensitive drum 22. A primary transfer roller 26, to which a positive voltage of +1,000 V is applied, for example, primarily transfers the image formed on the photosensitive drum 22 to an intermediate transfer belt 30. Toner that is not primarily transferred is collected by a recovery blade 27 into a waste toner box 28.

A member group that forms an image, that is, the charging roller 23, the developing unit 25, and the primary transfer roller 26 including the scanner unit 20 and the photosensitive drum 22, is also referred to as “image forming unit”. The members disposed in close proximity to the periphery of the photosensitive drum 22 to act on the photosensitive drum 22 (for example, the charging roller 23, the developing unit 25, and the primary transfer roller 26) are also referred to as “process unit”.

The intermediate transfer belt 30 is driven by rollers 31, 32, and 33 to convey the image primarily transferred to the intermediate transfer belt 30 to a secondary transfer portion. The convey of the recording material 12 is started again at the same timing at that of the image conveyed to the secondary transfer portion. By applying a secondary transfer voltage to the secondary transfer roller 29, the image is secondarily transferred from the intermediate transfer belt 30 to the recording material 12. Toner that is not secondarily transferred from the intermediate transfer belt 30 to the recording material 12 by the secondary transfer roller 29 is charged by a cleaning blush 35. The toner charged by the cleaning blush 35 is reversely transferred to the photosensitive drum 22. The toner reversely transferred to the photosensitive drum 22 is collected by the recovery blade 27 into the waste toner box 28.

The recording material 12 on which the image is secondarily transferred is fixed by heating by a fixing roller pair 16 and 17 serving as a fixing unit. The recording material 12 to which the image is fixed is discharged to an output tray.

A base-weight detection unit 50 includes an ultrasonic transmission unit 51 that transmits ultrasonic waves and an ultrasonic reception unit 52 that receives ultrasonic waves and radiates ultrasonic waves to the conveyed recording material 12 to detect the type of the recording material 12. A main control unit 200 (described later) controls conditions for image formation on the basis of the value of the result of detection made by the base-weight detection unit 50, the base weight of the recording material 12, or the type of the recording material 12. Examples of the conditions for image formation include the target temperature of a heater provided in the fixing unit and a secondary transfer bias applied to the secondary transfer roller 29.

Functional Block Diagram

Figure 2:
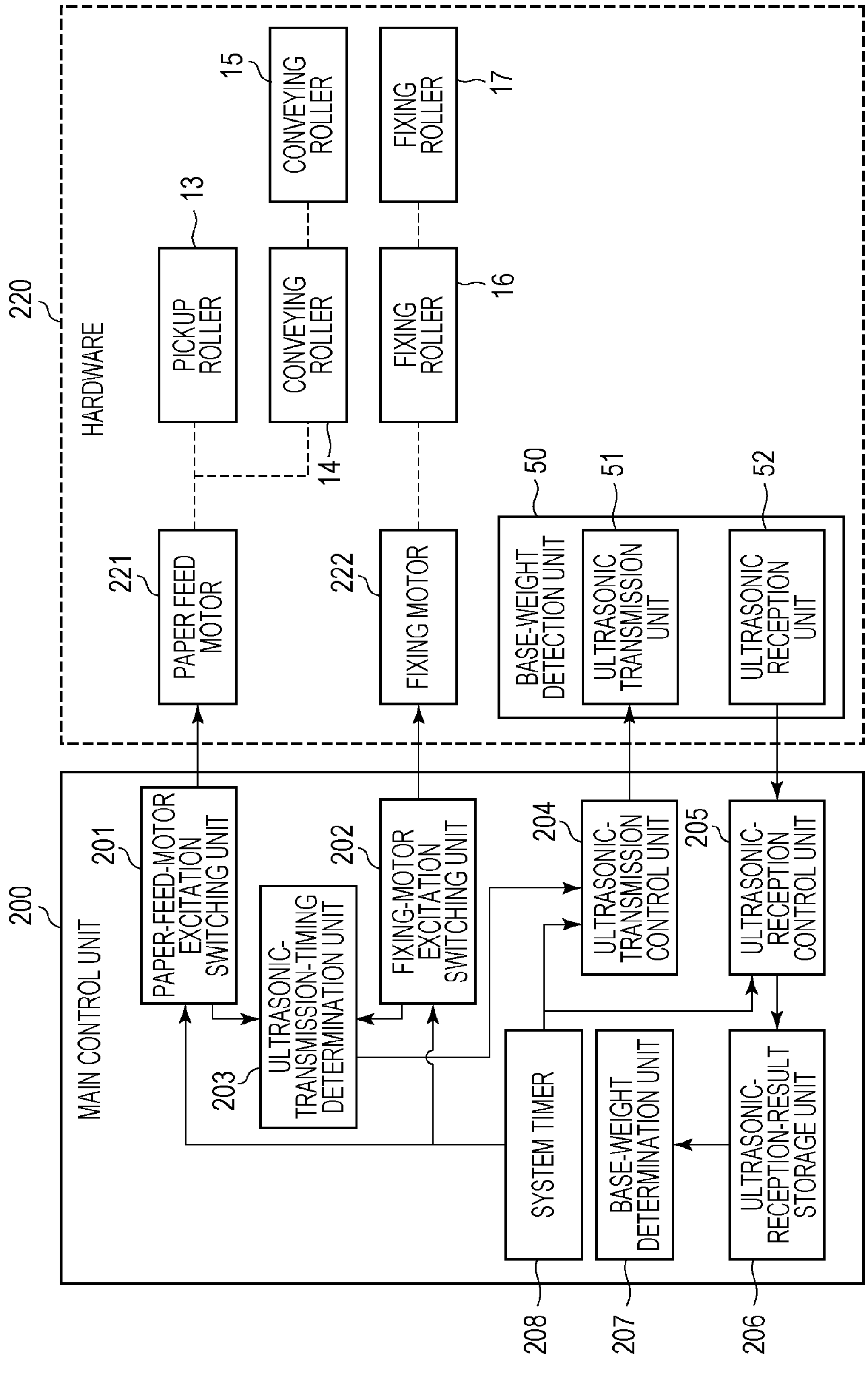
FIG. 2 is a diagram illustrating a functional block and a hardware block.

FIG. 2 is a diagram illustrating the functional block of the main control unit 200, which is a central processing unit (CPU), and hardware 220. The main control unit 200 has the following functions: a paper-feed-motor excitation switching unit 201, a fixing-motor excitation switching unit 202, an ultrasonic-transmission-timing determination unit 203, an ultrasonic-transmission control unit 204, an ultrasonic-reception control unit 205, an ultrasonic-reception-result storage unit 206, a base-weight determination unit 207, and a system timer 208. A paper feed motor 221 serving as a first driving unit, a fixing motor 222 serving as a second driving unit, the pickup roller 13, the conveying roller pair 14 and 15, the fixing roller pair 16 and 17, and the base-weight detection unit 50 constitute the hardware 220 controlled by the main control unit 200.

The paper-feed-motor excitation switching unit 201 drives the paper feed motor 221 serving as a driving unit by measuring the time course with the system timer 208 and switching the excitation at predetermined intervals stored in a memory (not shown). Likewise, the fixing-motor excitation switching unit 202 drives the fixing motor 222 serving as a driving unit by measuring the time course with the system timer 208 and switching the excitation at predetermined intervals stored in a memory (not shown).

The ultrasonic-transmission-timing determination unit 203 determines the timing at which the ultrasonic-transmission control unit 204 instructs the ultrasonic transmission unit 51 to transmit an ultrasonic wave on the basis of the time until the excitation of the paper feed motor 221 or the fixing motor 222 is switched to the next phase.

The ultrasonic-transmission control unit 204 measures the time course with the system timer 208 and instructs the ultrasonic transmission unit 51 to transmit an ultrasonic wave with a predetermined frequency at the timing determined by the ultrasonic-transmission-timing determination unit 203. The ultrasonic-reception control unit 205 measures the time course with the system timer 208, and when a predetermined time has passed after the ultrasonic-transmission control unit 204 outputs an ultrasonic wave, receives ultrasonic wave data from the ultrasonic reception unit 52, and stores the ultrasonic data in the ultrasonic-reception-result storage unit 206. The base-weight determination unit 207 determines the type of the recording material 12 or the base weight of the recording material 12 on the basis of the ultrasonic wave data stored in the ultrasonic-reception-result storage unit 206.

Base-Weight Detection Unit

Figure 3A:
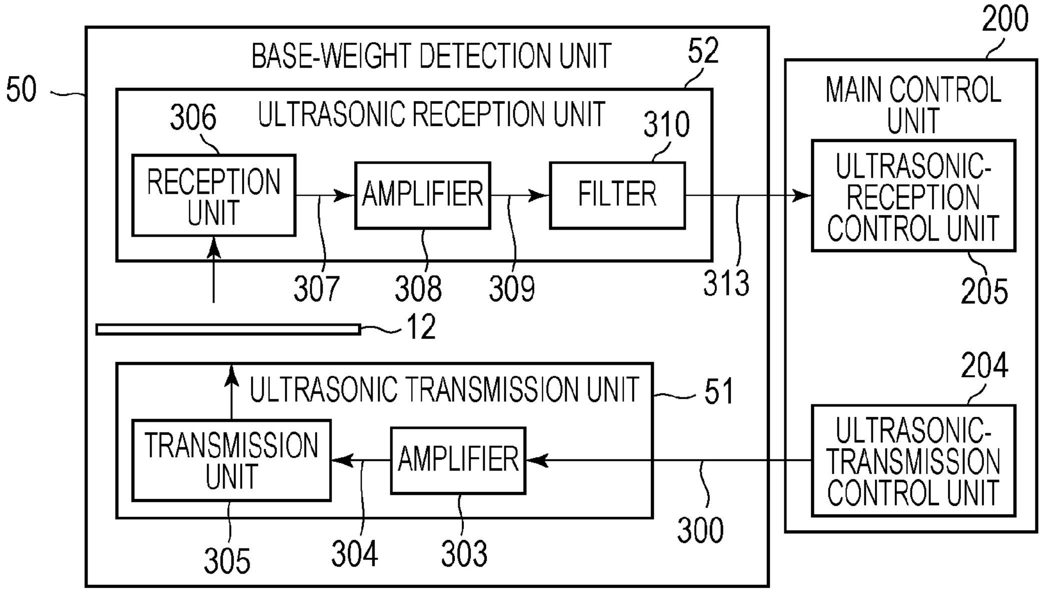
FIG. 3A is a block diagram illustrating the configuration of a base-weight detection unit.

FIG. 3A is a block diagram illustrating the base-weight detection unit 50. The main control unit 200 generates a drive signal 300 with the ultrasonic-transmission control unit 204 and outputs the drive signal 300 to an amplifier 303. The level (voltage value) of the drive signal 300 is amplified by the amplifier 303. An amplified drive signal 304 is output to a transmission unit 305. The transmission unit 305 outputs an ultrasonic wave according to the drive signal 304. In this embodiment, the frequency of the ultrasonic wave (the drive frequency of the transmission unit 305) is 40 KHz, for example. However, this is given for mere illustrative purposes. The frequency of the ultrasonic wave can be set according to the configurations of the transmission unit 305 and the reception unit 306, or the accuracy of determination of the base weight.

The reception unit 306 receives the ultrasonic wave that has been transmitted from the transmission unit 305 and that has passed through the recording material 12 and outputs a signal 307 indicating the intensity of the received ultrasonic wave to an amplifier 308. The level (voltage value) of the signal 307 is amplified by the amplifier 308. An amplified signal 309 is output to a filter 310. The filter 310 removes noise from the signal 309 and outputs a signal 313 to the ultrasonic-reception control unit 205 of the main control unit 200.

Operation of Transmitting and Receiving Ultrasonic Waves

Figure 3B:
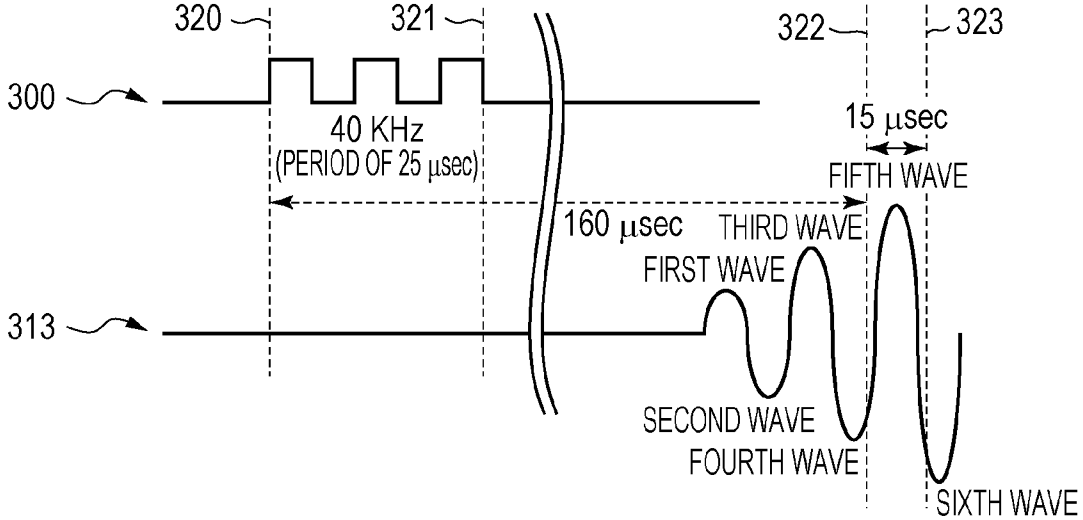
FIG. 3B is a diagram illustrating the operation of the base-weight detection unit.

FIG. 3B illustrates the waveform of the signal 313 received by the ultrasonic reception unit 52 when an ultrasonic wave with a frequency of 40 KHz is emitted from the ultrasonic transmission unit 51 to the recording material 12. The vertical axis indicates an output voltage, and the horizontal axis indicate time.

The main control unit 200 outputs the drive signal 300 at 40 KHz (320). After outputting three cycles of drive signal 300, the main control unit 200 stops the drive signal 300 (321). The transmission unit 305 emits an ultrasonic wave according to the drive signal 300. The main control unit 200 starts to sample the signal 313 (322) after a predetermined period of time from the time when the drive signal 300 is output to the ultrasonic transmission unit 51 (320). After a lapse of a fixed time from the start of the sampling (322), the main control unit 200 terminates the sampling (323).

In this embodiment, for sampling the fifth wave of the signal 313, the period of time until the sampling of the signal 313 is started is set to 160 μsec, and the period of the sampling is set to 15 μsec. The period is obtained experimentally according to the distance between the ultrasonic transmission unit 51 and the ultrasonic reception unit 52, for example. The time until the ultrasonic wave emitted from the transmission unit 305 reaches the reception unit 306 may be set appropriately because the time changes according to the distance between the transmission unit 305 and the reception unit 306, the surrounding environment (temperature and humidity), and so on.

Figure 3C:
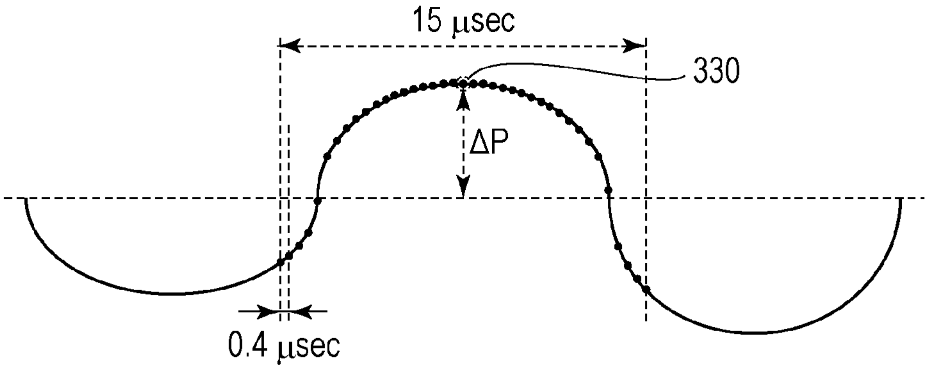
FIG. 3C is an enlarged diagram of a signal in a sampling section.

FIG. 3C is an enlarged diagram of the signal 313 in the sampling section (the section between 322 and 323). The ultrasonic-reception control unit 205 of the main control unit 200 samples the signal 313 discretely. The ultrasonic-reception control unit 205 stores the peak value ΔP of the sampled values in the ultrasonic-reception-result storage unit 206 (330). The amplitude of the waveform of the ultrasonic wave that has passed through the recording material 12 attenuates (the level (voltage value) of the signal 313 decreases) according to the base weight of the recording material 12. For example, if the recording material 12 has a relatively small base weight, like thin paper, the attenuation of the signal 313 is small, in other words, the peak value of the ultrasonic wave is large. In contrast, if the recording material 12 has a relatively large base weight, like heavy paper, the attenuation of the signal 313 is large, in other words, the peak value of the ultrasonic wave is small. Thus, to detect the amplitude of the waveform of an ultrasonic wave that has passed through the recording material 12, the peak value of the signal 313 is detected by the ultrasonic-reception control unit 205. This allows detection of the base weight of the recording material 12 according to the peak value. Alternatively, the type of the recording material 12 can be detected according to the peak value.

In this embodiment, the sampling interval is set to 0.4 μsec. This interval is obtained experimentally so that the base weight of the recording material 12 can be detected and may be set appropriately according to the configuration or the like of the base-weight detection unit 50.

Determining Base Weight of Recording Material 12

Figure 4:
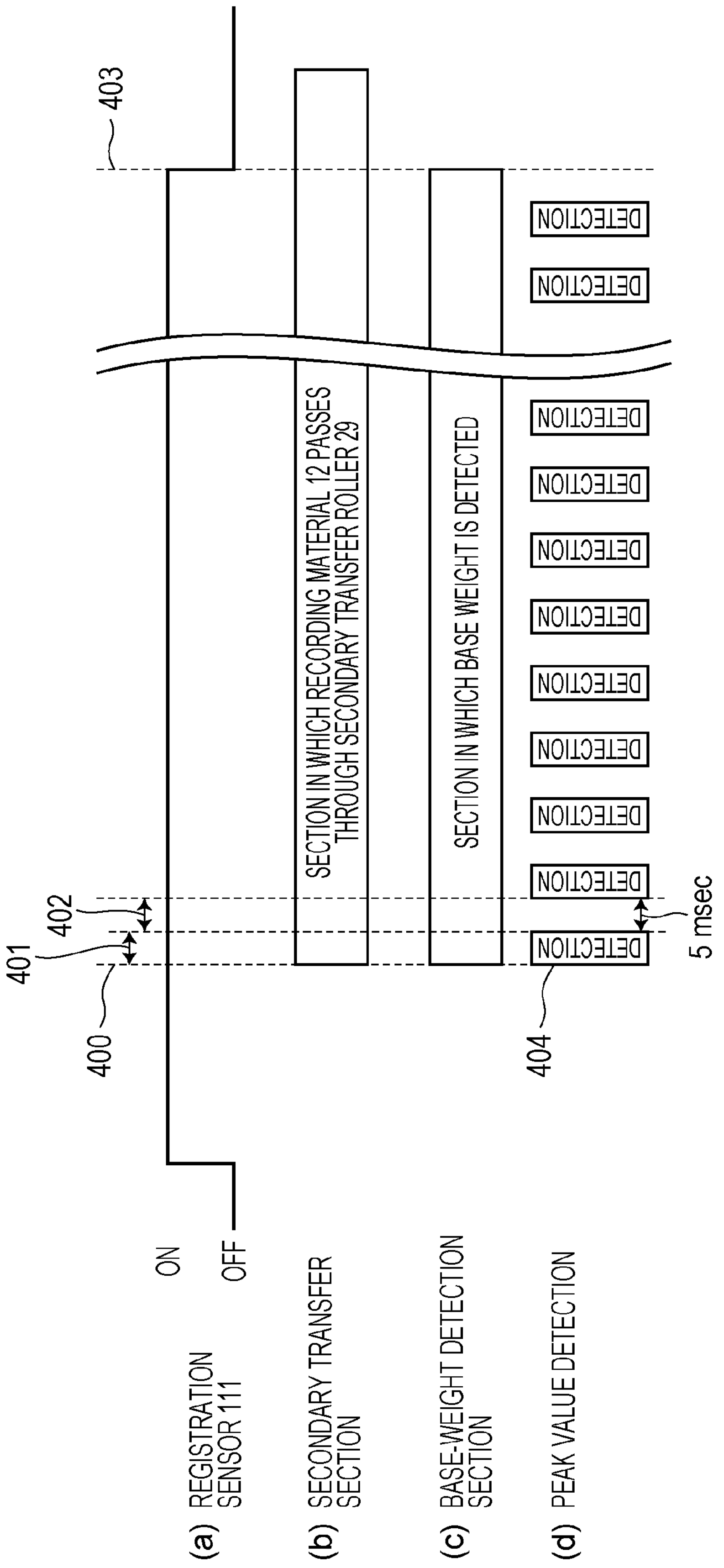
FIG. 4 is a diagram illustrating an operation for determining the base weight of the recording material.

FIG. 4 is a diagram illustrating, in outline, an operation for determining the base weight of the recording material 12. Item (a) in FIG. 4 shows a value output from the registration sensor 111 according to whether the recording material 12 is present. Item (b) in FIG. 4 shows a section in which the recording material 12 is passing through the secondary transfer roller 29 (secondary transfer section). Item (c) in FIG. 4 shows a section in which the main control unit 200 detects the base weight of the recording material 12.

Item (d) in FIG. 4 shows the timing when the main control unit 200 detects the peak value in the base-weight detecting section, illustrated in FIG. 3C.

After the leading end of the recording material 12 reaches the secondary transfer roller 29, the main control unit 200 start to perform detection of the base weight of the recording material 12 (400). The result of the detection of the base weight of the recording material 12 varies according to the detection position of the recording material 12. For this reason, the main control unit 200 detects the base weight at multiple portions of the recording material 12 in consideration of variations in the recording material 12. The detection at multiple portions allows reducing or eliminating the influence of the variations.

The main control unit 200 outputs the drive signal 300 with the ultrasonic-transmission control unit 204 and detects the peak value of the signal 313 with the ultrasonic-reception control unit 205 (401 and 404). After detecting the peak value, the main control unit 200 waits until a lapse of a time necessary for the ultrasonic wave emitted from the transmission unit 305 to attenuate. After the ultrasonic wave attenuates, the ultrasonic-transmission control unit 204 outputs the drive signal 300 and detects the peak value of the signal 313 with the ultrasonic-reception control unit 205 (402). In this embodiment, the time required for the ultrasonic wave to attenuate is 5 msec. The time required for the ultrasonic wave to attenuate is determined experimentally and can be set as appropriate according to the configuration of the base-weight detection unit 50, the frequency of the drive signal 300, the surrounding environment (temperature and humidity), and the like.

When the registration sensor 111 detects the trailing end of the recording material 12, the main control unit 200 terminates the detection by the base-weight detection unit 50 (403). The base-weight determination unit 207 calculates the average of the detected peak values and determines the base weight of the recording material 12 from the average of the peak values.

The memory (not shown) of the main control unit 200 stores information on fixing temperatures, which are set according to the base weights of the recording materials 12. The fixing temperature is set according to the base weight of the recording material 12 determined by the base-weight determination unit 207. For example, for a recording material 12 with a small base weight, such as thin paper, the fixing temperature is set low to reduce necessary electric power.

Switching Excitation of Motor and Detecting Base Weight

Figure 5:
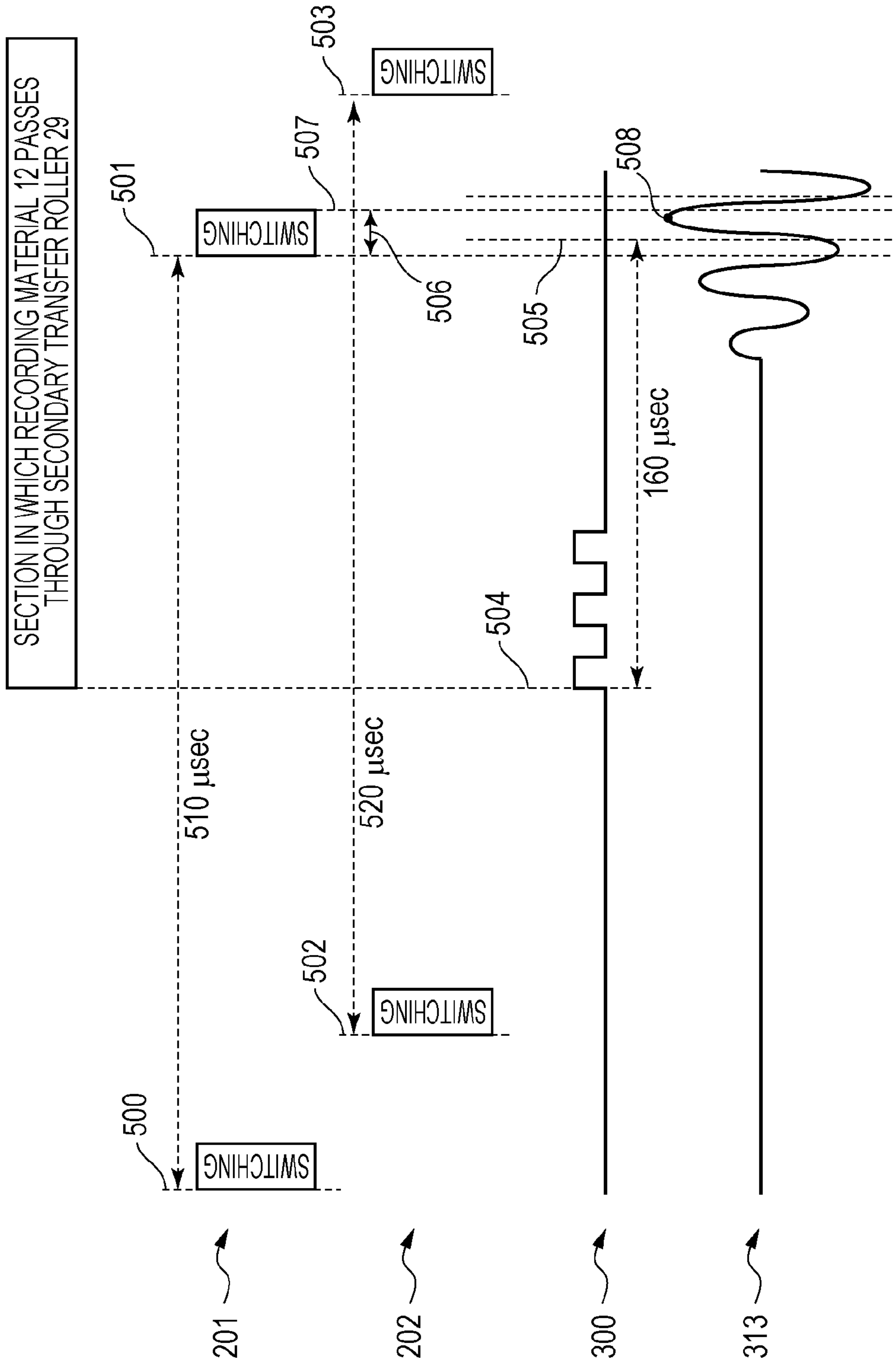
FIG. 5 is a diagram illustrating a motor-excitation switching process and a base-weight detection process.

FIG. 5 is a diagram illustrating the timing at which the peak value-detection timing described in FIG. 4 (404) and the motor-excitation switch timing overlap. The paper-feed-motor excitation switching unit 201 switches the excitation of the paper feed motor 221 at regular intervals (500 and 501). Likewise, the fixing-motor excitation switching unit 202 switches the excitation of the fixing motor 222 at regular intervals (502 and 503). The motor excitation switch interval depends on the configuration of the motor, the configuration of a gear for transmitting the drive from the motor to the conveying rollers, and so on. In this embodiment, the excitation switch interval of the paper feed motor 221 is 510 μsec, and the excitation switch interval of the fixing motor 222 is 520 μsec.

The main control unit 200 switches the excitation of the paper feed motor 221 at intervals of 510 μsec (500 and 501) and switches the excitation of the fixing motor 502 at intervals of 520 μsec (502 and 503). The main control unit 200 starts to perform detection of the base weight of the recording material 12 after the leading end of the recording material 12 reaches the secondary transfer roller 29. The main control unit 200 starts to drive the drive signal 300 to detect the peak value (504). After a lapse of 160 μsec after the start of the drive of the drive signal 300, it comes the timing to start sampling of the signal 313 (505).

However, since the main control unit 200 is in the process of switching the excitation of the paper feed motor 221 (506), the main control unit 200 cannot start sampling of the signal 313 until the excitation switching process is completed (507). If the motor excitation switching process and the process of sampling the signal 313 overlap, the main control unit 200 may be unable to detect the peak value 508 of the signal 313. This can result in a decrease in the number of peak values that the main control unit 200 can detect while conveying one recording material 12, which may decrease the accuracy of detection of the base weight of the recording material 12.

Figure 6:
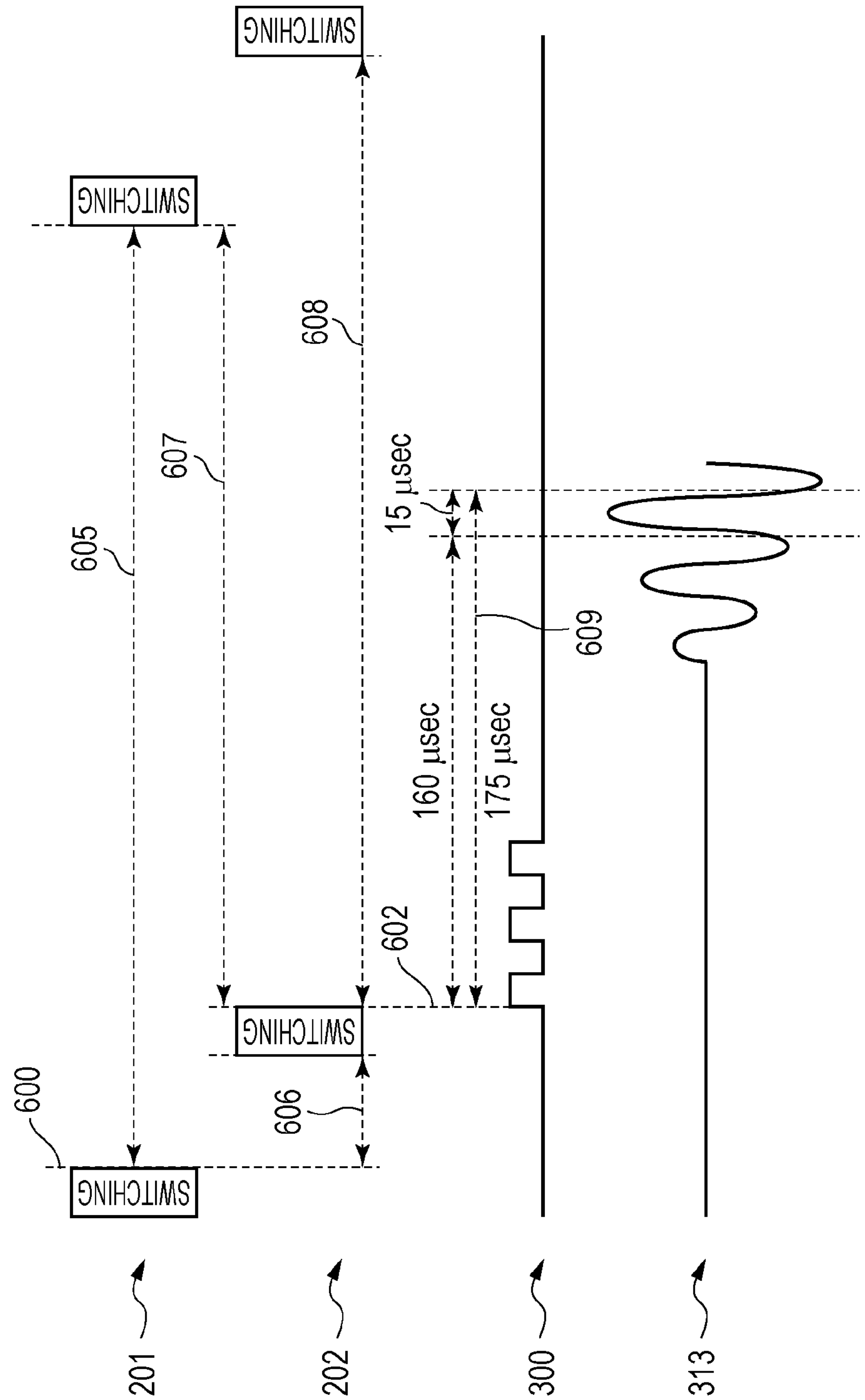
FIG. 6 is a diagram illustrating a motor-excitation switching process and a base-weight detection process.

FIG. 6 is a diagram illustrating the motor-excitation switch timing and the base-weight detection timing in this embodiment. The main control unit 200 determines whether to output the drive signal 300 by comparing the times until the excitation of the paper feed motor 221 and the excitation of the fixing motor 222 is switched with the time from outputting the ultrasonic wave to detecting the peak value.

At the timing when the switching of the excitation of the paper feed motor 221 is completed (600), the main control unit 200 determines the time until the excitation of the paper feed motor 221 is switched next (605) and the time until the excitation of the fixing motor 222 is switched next (606). Then, the main control unit 200 compares the times (605) and (606) with the time (609) from outputting the ultrasonic wave to detecting the peak value.

In this case, the time from the timing when the switching of the excitation of the paper feed motor 221 is completed (600) to the time when the excitation of the fixing motor 222 is switched (606) is shorter than the time from outputting the ultrasonic wave to detecting the peak value (609). Accordingly, the main control unit 200 determines that the process of switching the excitation of the fixing motor 222 and the peak-value detection process can overlap. For this reason, the main control unit 200 determines not to output the drive signal 300 at the timing when the switching of the excitation of the paper feed motor 221 is completed (600).

Next, at the timing when the process of switching the excitation of the fixing motor 222 is completed (602), the main control unit 200 determines the time until the excitation of the paper feed motor 221 is switched next (607) and the time when the excitation of the fixing motor 222 is switched next (608). Then, the main control unit 200 compares the times (607) and (608) with the time (609) from outputting the ultrasonic wave to detecting the peak value.

In this case, the time (607) from the timing when the switching of the excitation of the fixing motor 222 is completed (602) to the time when the excitation of the paper feed motor 221 is switched is longer than the time from outputting the ultrasonic wave to detecting the peak value (609). Furthermore, the time (608) from the timing when the switching of the excitation of the fixing motor 222 is completed (602) to the time when the excitation of the fixing motor 222 is switched next is longer than the time from outputting the ultrasonic wave to detecting the peak value (609). Accordingly, the main control unit 200 determines that the process of switching the excitation of the paper feed motor 221 or the process of switching the excitation of the fixing motor 222 will not overlap with the peak-value detection process. For this reason, the main control unit 200 outputs the drive signal 300 for transmitting an ultrasonic wave at the timing when the switching of the excitation of the fixing motor 222 is completed (602).

Thus, the main control unit 200 compares the timing when the excitation of the paper feed motor 221 or the fixing motor 222 is switched next with the timing when the detection of the peak value is completed after an ultrasonic wave is output. This allows determining not to output an ultrasonic wave when the switch timing of excitation of the paper feed motor 221 or the fixing motor 222 can overlap with the peak-value detection timing. This prevents transmission of an ultrasonic wave at the timing when the peak value of the ultrasonic wave cannot be detected because of the overlap of the timing. This also allows determining to output an ultrasonic wave when there is no possibility that the timing at which the excitation of the fixing motor 222 or the paper feed motor 221 is switched can overlap with the peak-value detection timing. This allows shifting the excitation switch timing and the detection timing of the peak value of the ultrasonic wave, allowing the detection of the peak value of the ultrasonic wave.

Figure 7:
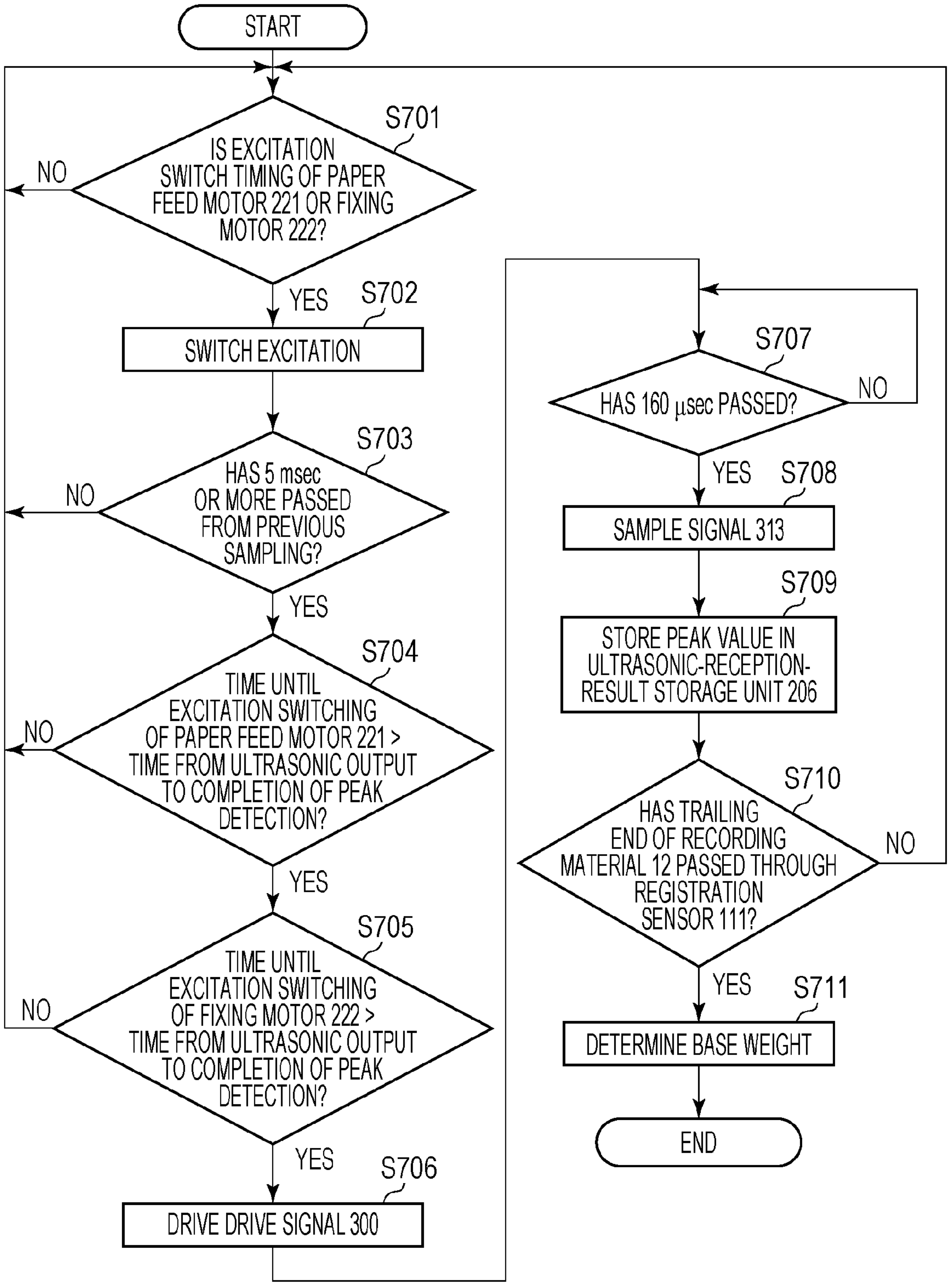
FIG. 7 is a flowchart for determining whether to perform base-weight detection at the timing when the switching of the excitation of the motor is completed.

FIG. 7 is a flowchart for determining whether to perform base-weight detection at the timing when the switching of the excitation of the motor is completed. In S701, the main control unit 200 determines whether it has come to the excitation switch timing of the paper feed motor 221 or the fixing motor 222. If in S701 the main control unit 200 determines that the excitation switch timing of the paper feed motor 221 or the fixing motor 222 has come, then in S702 the main control unit 200 executes the process of switching the excitation of the paper feed motor 221 or the fixing motor 222.

In S703, the main control unit 200 determines whether 5 msec has passed from the previous sampling of the peak value of the ultrasonic wave. If not, the main control unit 200 does not perform base-weight detection and waits for the next excitation switch timing of the paper feed motor 221 or the fixing motor 222. If 5 msec or more has passed from the previous sampling of the peak value of the ultrasonic wave, then in S704 the main control unit 200 compares the time until the next switching of the excitation of the paper feed motor 221 with the time after outputting the ultrasonic wave to detecting the peak value. If the time until the next switching of the excitation of the paper feed motor 221 is longer than the time from outputting the ultrasonic wave to detecting the peak value, then the process goes to S705.

In S705, the main control unit 200 compares the time until the next switching of the excitation of the fixing motor 222 with the time from outputting the ultrasonic wave to detecting the peak value. If the time until the next switching of the excitation of the fixing motor 222 is longer than the time from outputting the ultrasonic wave to detecting the peak value, the process goes to S706. In S706, the main control unit 200 outputs the drive signal 300 to transmit an ultrasonic wave.

In S707, the main control unit 200 determines whether 160 μsec has passed from the output of the drive signal 300. If yes, then in S708 the main control unit 200 samples the signal 313 to determine the peak value. In S709, the main control unit 200 stores the detected peak value in the ultrasonic-reception-result storage unit 206. In S710, the main control unit 200 determines whether the trailing end of the recording material 12 has passed through the registration sensor 111. If the trailing end of the recording material 12 has not passed through the registration sensor 111, the process returns to S701. If the trailing end of the recording material 12 has passed through the registration sensor 111, then in S711 the main control unit 200 determines the base weight of the recording material 12 on the basis of the average of the peak values stored in the ultrasonic-reception-result storage unit 206.

Thus, the main control unit 200 can determine not to output an ultrasonic wave when the switch timing of the excitation of the paper feed motor 221 or the fixing motor 222 may overlap with the peak-value detection timing. This allows preventing transmission of an ultrasonic wave at the timing when the peak value of the ultrasonic wave cannot be detected because of the overlap of the timing. This also allows determining to output an ultrasonic wave when there is no possibility that the timing at which the excitation of the fixing motor 222 or the paper feed motor 221 is switched can overlap with the peak-value detection timing. This allows shifting the excitation switch timing and the detection timing of the peak value of the ultrasonic wave, allowing the detection of the peak value of the ultrasonic wave.

Here, a method of determining the base weight of the recording material 12 when the trailing end of the recording material 12 has passed through the registration sensor 111 is described by way of example. However, this is given for mere illustrative purposes. The base weight of the recording material 12 may be determined when the number of obtained peak values reaches a fixed value. A method of determining the base weight using the peak value of the fifth wave of the signal 313 has been described. However, this is given for mere illustrative purposes. The base weight may be determined using multiple peak values, for example, the peak values of the fourth and fifth waves.

Second Embodiment

The first embodiment describes a case in which the time until the motor-excitation switch timing is longer than the time after outputting the ultrasonic wave to detecting of the peak value. The second embodiment describes a case in which the time until the motor-excitation switch timing is shorter than the time after outputting the ultrasonic wave to detecting the peak value. For the same configuration as that of the first embodiment, such as that of the image forming apparatus, detailed description will be omitted in this embodiment.

Figure 8:
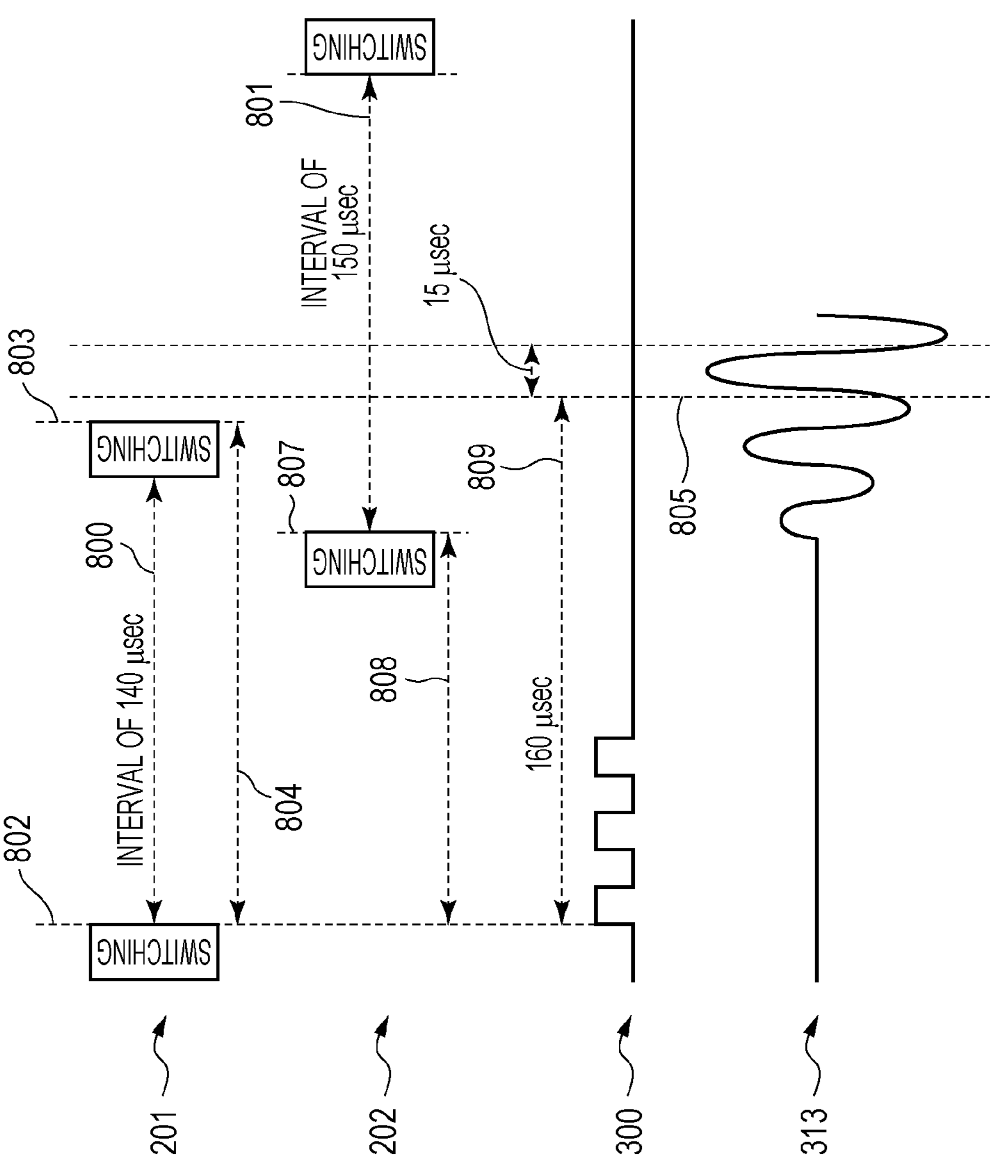
FIG. 8 is a diagram illustrating a motor-excitation switching process and a base-weight detection process.

FIG. 8 is a diagram illustrating the motor-excitation switch timing and the base-weight detection timing in this embodiment. The main control unit 200 determines whether to output the drive signal 300 by comparing the times until the excitation of the paper feed motor 221 and the excitation of the fixing motor 222 is switched with the time from outputting the ultrasonic wave to detecting the peak value.

The main control unit 200 performs a process for switching the excitation of the paper feed motor 221 at intervals of 140 μsec (800) and a process of switching the excitation of the fixing motor 222 at intervals of 150 μsec (801).

At the timing when the switching of the excitation of the paper feed motor 221 is completed (802), the main control unit 200 determines the time until the process of switching the excitation of the paper feed motor 221 is completed next (804) and the time until the process of switching the excitation of the fixing motor 222 is completed next (808). Then, the main control unit 200 compares the times (804) and (808) with the time (809) from outputting the ultrasonic wave to detecting the peak value.

In this case, the time (804) from the timing when the switching of the excitation of the paper feed motor 221 is completed (802) to the time when the excitation of the paper feed motor 221 is switched next is shorter than the time from outputting the ultrasonic wave to detecting the peak value (809). Furthermore, the time (808) from the timing when the switching of the excitation of the paper feed motor 221 is completed (802) to the time when the excitation of the fixing motor 222 is switched is shorter than the time from outputting the ultrasonic wave to detecting the peak value (809). Accordingly, the main control unit 200 determines that the process of switching the excitation of the paper feed motor 221 or the process of switching the excitation of the fixing motor 222 will not overlap with the peak-value detection process. For this reason, the main control unit 200 outputs the drive signal 300 for transmitting an ultrasonic wave at the timing when the switching of the excitation of the paper feed motor 221 is completed (802).

Thus, the main control unit 200 compares the timing when the excitation of the paper feed motor 221 or the fixing motor 222 is switched next with the timing when the detection of the peak value is completed after an ultrasonic wave is output. This allows determining not to output an ultrasonic wave when the switch timing of excitation of the paper feed motor 221 or the fixing motor 222 can overlap with the peak-value detection timing. This prevents transmission of an ultrasonic wave at the timing when the peak value of the ultrasonic wave cannot be detected because of the overlap of the timing. This also allows determining to output an ultrasonic wave when there is no possibility that the timing at which the excitation of the fixing motor 222 or the paper feed motor 221 is switched can overlap with the peak-value detection timing. This allows shifting the excitation switch timing and the detection timing of the peak value of the ultrasonic wave, allowing the detection of the peak value of the ultrasonic wave.

Figure 9:
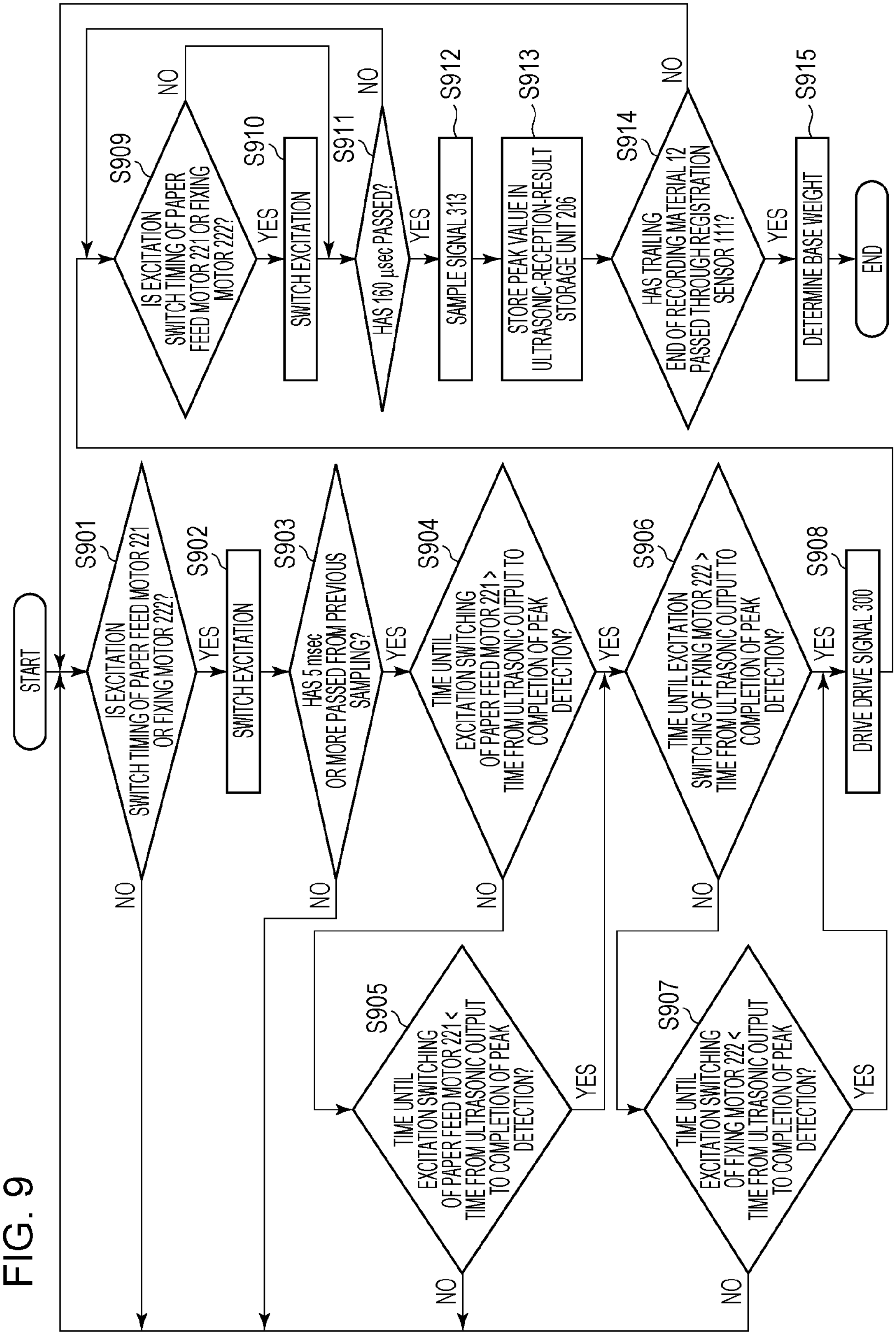
FIG. 9 is a flowchart for determining whether to perform base-weight detection at the timing when the switching of the excitation of the motor is completed.

FIG. 9 is a flowchart for determining whether to perform base-weight detection at the timing when the switching of the excitation of the motor is completed. In S901, the main control unit 200 determines whether it has come to the excitation switch timing of the paper feed motor 221 or the fixing motor 222. If in S901 the main control unit 200 determines that the excitation switch timing of the paper feed motor 221 or the fixing motor 222 has come, then in S902 the main control unit 200 executes the process of switching the excitation of the paper feed motor 221 or the fixing motor 222.

In S903, the main control unit 200 determines whether 5 msec has passed from the previous sampling of the peak value of the ultrasonic wave. If not, the main control unit 200 does not perform detection of the base weight and waits for the next excitation switch timing of the paper feed motor 221 or the fixing motor 222. If 5 msec or more has passed from the previous sampling of the peak value of the ultrasonic wave, then in S904 the main control unit 200 compares the time until the next switching of the excitation of the paper feed motor 221 with the time after outputting the ultrasonic wave to detecting the peak value. If the time until the next switching of the excitation of the paper feed motor 221 is longer than the time from outputting the ultrasonic wave to detecting the peak value, then the process goes to S906. If the time until the next switching of the excitation of the paper feed motor 221 is shorter than the time from outputting the ultrasonic wave to detecting the peak value, then the process goes to S905.

In S905, the main control unit 200 compares the time until completion of the next switching of the excitation of the paper feed motor 221 with the time from outputting the ultrasonic wave to detecting the peak value. If the time until completion of the next switching of the excitation of the paper feed motor 221 is shorter than the time from outputting the ultrasonic wave to detecting the peak value, the process goes to S906.

In S906, the main control unit 200 compares the time until the next switching of the excitation of the fixing motor 222 with the time from outputting the ultrasonic wave to detecting the peak value. If the time until the next switching of the excitation of the fixing motor 222 is longer than the time from outputting the ultrasonic wave to detecting the peak value, the process goes to S908. If the time until the next switching of the excitation of the fixing motor 222 is shorter than the time from outputting the ultrasonic wave to detecting the peak value, the process goes to S907.

In S907, the main control unit 200 compares the time until completion of the next switching of the excitation of the fixing motor 222 with the time from outputting the ultrasonic wave to detecting the peak value. If the time until completion of the next switching of the excitation of the fixing motor 222 is shorter than the time from outputting the ultrasonic wave to detecting the peak value, the process goes to S908.

In S908, the main control unit 200 outputs the drive signal 300 to transmit an ultrasonic wave. In S909, the main control unit 200 determines whether it has come to the excitation switch timing of the paper feed motor 221 or the fixing motor 222. If it has come to the switch timing, then in S910 the main control unit 200 switches the excitation of the paper feed motor 221 or the fixing motor 222.

In S911, the main control unit 200 determines whether 160 μsec has passed from the output of the drive signal 300. If yes, then in S912 the main control unit 200 samples the signal 313 to determine the peak value. In S913, the main control unit 200 stores the detected peak value in the ultrasonic-reception-result storage unit 206. In S914, the main control unit 200 determines whether the trailing end of the recording material 12 has passed through the registration sensor 111. If the trailing end of the recording material 12 has not passed through the registration sensor 111, the process returns to S901. If the trailing end of the recording material 12 has passed through the registration sensor 111, then in S915 the main control unit 200 determines the base weight of the recording material 12 on the basis of the average of the peak values stored in the ultrasonic-reception-result storage unit 206.

Thus, the main control unit 200 can determine not to output an ultrasonic wave when the switch timing of the excitation of the paper feed motor 221 or the fixing motor 222 may overlap with the peak-value detection timing. This allows preventing transmission of an ultrasonic wave at the timing when the peak value of the ultrasonic wave cannot be detected because of the overlap of the timing. This also allows determining to output an ultrasonic wave when there is no possibility that the timing at which the excitation of the fixing motor 222 or the paper feed motor 221 is switched can overlap with the peak-value detection timing. This allows shifting the excitation switch timing and the detection timing of the peak value of the ultrasonic wave, allowing the detection of the peak value of the ultrasonic wave.

Third Embodiment

This embodiment describes a method of changing the motor-excitation switch time (the motor speed) when the time until the excitation of the motor is switched is shorter than the time after outputting the ultrasonic wave to detecting the peak value. For the same configuration as those of the first and second embodiments, such as that of the image forming apparatus, detailed description will be omitted in this embodiment.

In this embodiment, the main control unit 200 changes the excitation switch interval of the fixing motor 222 during the period in which the fixing roller pair 16 and 17 is not conveying the recording material 12. The main control unit 200 switches the excitation of the paper feed motor 221 and the excitation of the fixing motor 222 in synchronization and detects the base weight of the recording material 12. With this method, the number of peak values determined for one recording material 12 is small. For this reason, if the number of peak values for determining the base weight is insufficient, base-weight detection needs to be performed for multiple recording materials 12. In this embodiment, the number of recording materials 12 necessary for determining the base weight is two.

The main control unit 200 repeats the same operation also on the subsequent recording materials 12 to obtain a sufficient number of peak values for determining the base weight, thereby determining the base weight of the recording materials 12. In this embodiment, the excitation switch interval of the paper feed motor 221 and the excitation switch interval of the fixing motor 222 in a printing operation are set to 200 μsec and 150 μsec, respectively.

Figure 10:
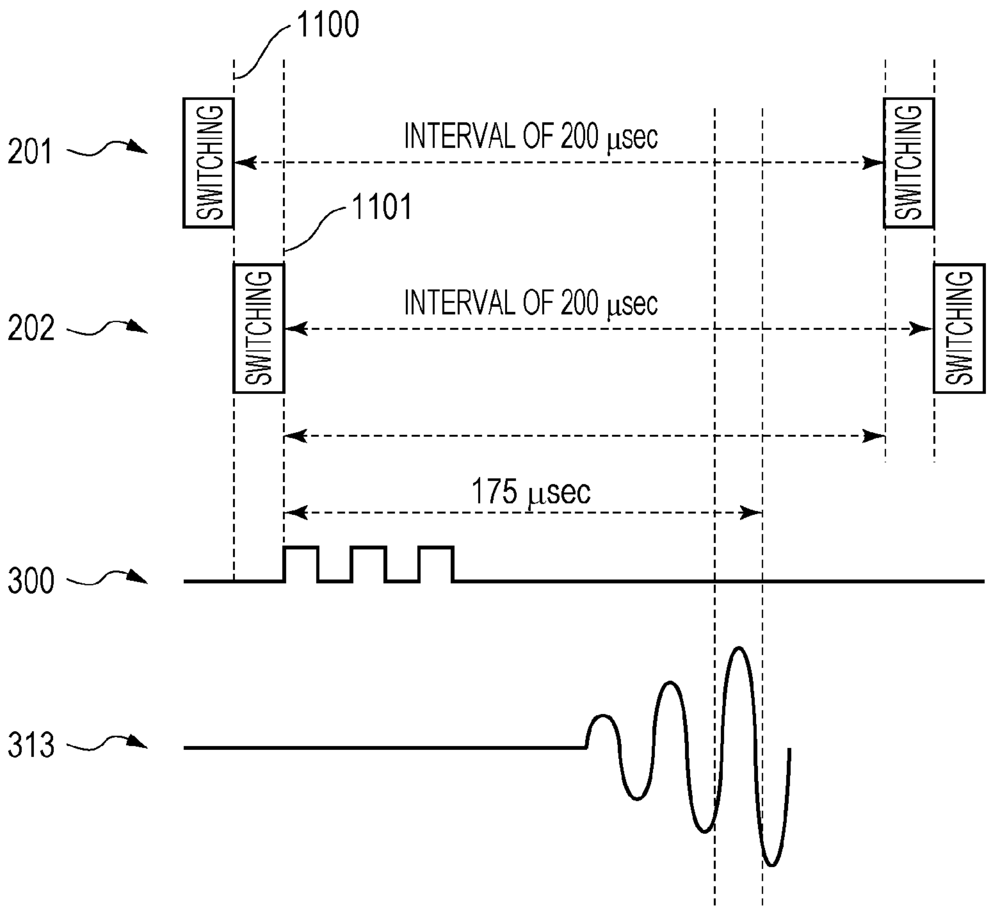
FIG. 10 is a diagram illustrating a motor-excitation switching process and a base-weight detection process.

FIG. 10 is a diagram illustrating the motor-excitation switch timing and the base-weight detection timing in this embodiment, illustrating an operation for changing the excitation switch interval of the fixing motor 222 to 200 μsec during the period in which the fixing roller pair 16 and 17 is not conveying the recording material 12.

The main control unit 200 switches the excitation of the fixing motor 222 (1101) at the timing when the switching of the excitation of the paper feed motor 221 is completed (1100). The main control unit 200 changes the excitation switch interval of the fixing motor 222 to 200 μsec at the timing when the switching of the excitation of the fixing motor 222 is completed (1101). Thus, the main control unit 200 determines that the motor-excitation switching process and the peak-value detection process do not overlap and outputs the drive signal 300 for transmitting an ultrasonic wave.

Thus, switching the excitation of the paper feed motor 221 and the excitation of the fixing motor 222 in synchronization allows shifting the excitation switch timing and the detection timing of the peak value of the ultrasonic wave, enabling the peak value of the ultrasonic wave to be detected.

Figure 11:
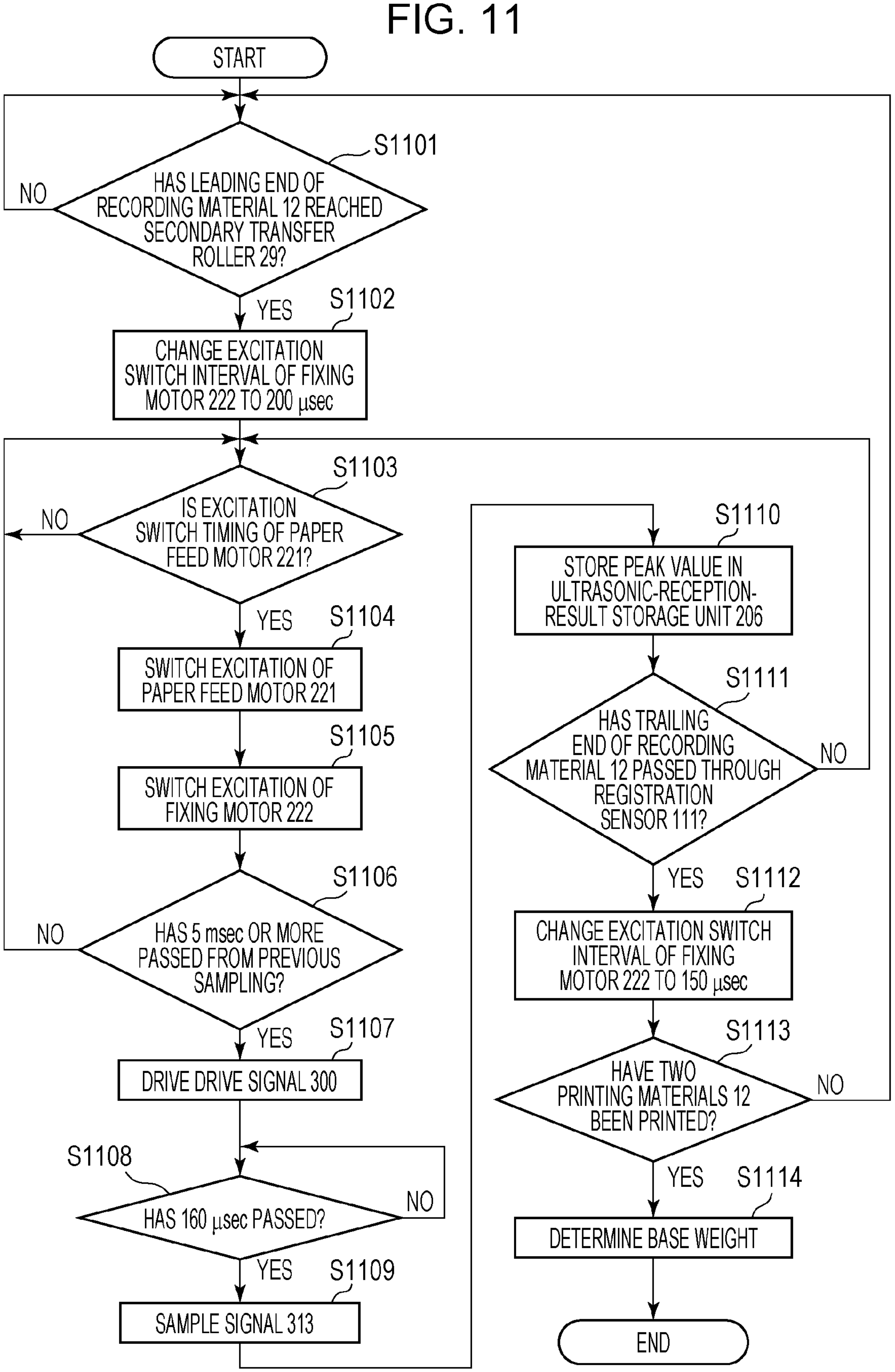
FIG. 11 is a flowchart for a method of switching the excitation of a paper feed motor and the excitation of a fixing motor at the same timing

FIG. 11 is a flowchart for a method of switching the excitation of the paper feed motor 221 and the excitation of the fixing motor 222 at the same timing. In S1101, the main control unit 200 determines whether the leading end of the recording material 12 has reached the secondary transfer roller 29. If yes, then in S1102 the main control unit 200 changes the excitation switch interval of the fixing motor 222 to 200 μsec.

In S1103, the main control unit 200 determines whether it has come to the excitation switch timing of the paper feed motor 221. When it has come to switch timing, then in S1104 the main control unit 200 executes the process of switching the excitation of the paper feed motor 221. In S1105, the main control unit 200 executes the process of switching the excitation of the fixing motor 222. In S1106, the main control unit 200 determines whether 5 msec has passed from the previous sampling of the peak value of the ultrasonic wave. If not, the main control unit 200 does not perform detection of the base weight.

If 5 msec or more has passed from the previous sampling of the peak value of the ultrasonic wave, then in S1107 the main control unit 200 outputs the drive signal 300 to transmit an ultrasonic wave. In S1108, the main control unit 200 determines whether 160 μsec has passed from output of the drive signal 300. If yes, then in S1109 the main control unit 200 samples the signal 313 to determine the peak value. In S1110, the main control unit 200 stores the detected peak value in the ultrasonic-reception-result storage unit 206.

In S1111, the main control unit 200 determines whether the trailing end of the recording material 12 has passed through the registration sensor 111. If the trailing end of the recording material 12 has not passed through the registration sensor 111, the process returns to S1103. If the trailing end of the recording material 12 has passed through the registration sensor 111, then in S1112 the main control unit 200 changes the excitation switch interval of the fixing motor 222 to 150 psec.

In S1113, the main control unit 200 determines whether two recording materials 12 have been printed. If two recording materials 12 have not been printed, the process returns to S1101. If two recording material 12 have been printed, then in S1114 the main control unit 200 determines the base weight of the recording materials 12 on the basis of the average of the peak values stored in the ultrasonic-reception-result storage unit 206.

Thus, switching the excitation of the paper feed motor 221 and the excitation of the fixing motor 222 in synchronization allows shifting the excitation switch timing and the detection timing of the peak value of the ultrasonic wave, enabling the peak value of the ultrasonic wave to be detected.

This embodiment describes a method of changing the excitation switch interval of the fixing motor 222. However, this is given for mere illustrative purposes. For example, a method of changing the excitation switch interval of the paper feed motor 221 may be employed. Alternatively, a method of changing the excitation switch intervals of both of the paper feed motor 221 and the fixing motor 222 may be employed.

This embodiment describes a method of determining the base-weight determination timing according to the number of prints. However, this is given for mere illustrative purposes. Another method of counting the number of determined peak values and determining the base weight when the number of peak values determined reaches a fixed value (for example, 300) may be employed.

This embodiment describes a method of changing the excitation switch interval of the fixing motor 222 at the timing when the fixing roller pair 16 and 17 does not convey the recording material 12. However, this is given for mere illustrative purposes. For example, a method of decreasing the overall printing speed to change the excitation switch interval of the fixing motor 222 at the timing when the fixing roller pair 16 and 17 conveys the recording material 12 may be employed.

With the configuration according to the embodiment of the present disclosure, when the driving unit and the sensor are controlled with a common control unit, the detection timing of the sensor can be controlled according to the state of the driving unit.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

a conveying roller configured to convey a recording material;

an image forming unit configured to form an image on the recording material conveyed by the conveying roller;

a motor configured to drive the conveying roller;

an ultrasonic transmission unit configured to transmit an ultrasonic wave to the recording material being conveyed by the conveying roller;

an ultrasonic reception unit configured to receive the ultrasonic wave transmitted by the ultrasonic transmission unit and passed through the recording material; and a control unit configured to detect a type of the recording material or a basis-weight of the recording material based on the ultrasonic wave received by the ultrasonic reception unit, wherein the control unit is configured to control the ultrasonic transmission unit to transmit the ultrasonic wave such that a timing at which the ultrasonic wave is received by the ultrasonic reception unit does not overlap with a timing at which excitation of the motor is switched.

2. The image forming apparatus according to claim 1, wherein the control unit controls a condition for image formation of the image forming unit based on the type or the basis-weight of the recording material.

3. The image forming apparatus according to claim 1, wherein a time from switching the excitation of the motor to next switching of the excitation of the motor is longer than a time from transmitting the ultrasonic wave to obtaining a value of the received ultrasonic wave.

4. The image forming apparatus according to claim 1, wherein a time from switching the excitation of the motor to next switching of the excitation of the motor is shorter than a time from transmitting the ultrasonic wave to obtaining a value of the received ultrasonic wave.

5. The image forming apparatus according to claim 1, wherein the control unit determines a timing at which switching of the excitation of the motor is completed.

6. An image forming apparatus comprising:

a conveying roller configured to convey a recording material;

an image forming unit configured to form an image on the recording material conveyed by the conveying roller;

a fixing unit configured to fix the image on the recording material;

a motor configured to drive the fixing unit;

an ultrasonic transmission unit configured to transmit an ultrasonic wave to the recording material being conveyed by the conveying roller;

an ultrasonic reception unit configured to receive the ultrasonic wave transmitted by the ultrasonic transmission unit and passed through the recording material; and a control unit configured to detect a type of the recording material or a basis-weight of the recording material based on the ultrasonic wave received by the ultrasonic reception unit, wherein the control unit is configured to control the ultrasonic transmission unit to transmit the ultrasonic wave such that a timing at which the ultrasonic wave is received by the ultrasonic reception unit does not overlap with a timing at which excitation of the motor is switched.

7. The image forming apparatus according to claim 6, wherein the control unit controls a condition for fixing the image of the fixing unit based on the type or the basis-weight of the recording material.

8. The image forming apparatus according to claim 6, wherein a time from switching the excitation of the motor to next switching of the excitation of the motor is longer than a time from transmitting the ultrasonic wave to obtaining a value of the received ultrasonic wave.

9. The image forming apparatus according to claim 6, wherein a time from switching the excitation of the motor to next switching of the excitation of the motor is shorter than a time from transmitting the ultrasonic wave to obtaining a value of the received ultrasonic wave.

10. The image forming apparatus according to claim 6, wherein the control unit determines a timing at which switching of the excitation of the motor is completed.

* * * * *